No. 715,418. Patented Dec. 9, 1902.
G. W. PARSONS.
BAND CUTTER AND FEEDER FOR THRESHING MACHINES.
(Application filed Apr. 8, 1901.)

(No Model.) 6 Sheets—Sheet 1.

Witnesses: Inventor G. W. Parsons.
by Orwig & Lane Attys.

THE NORRIS PETERS CO., PHOTO-LITHO., WASHINGTON, D. C.

No. 715,418. Patented Dec. 9, 1902.
G. W. PARSONS.
BAND CUTTER AND FEEDER FOR THRESHING MACHINES.
(Application filed Apr. 8, 1901.)
(No Model.) 6 Sheets—Sheet 2.

Fig. 2.

Witnesses:
Inventor G. W. Parsons
by Orwig & Lane Attys.

No. 715,418. Patented Dec. 9, 1902.
G. W. PARSONS.
BAND CUTTER AND FEEDER FOR THRESHING MACHINES.
(Application filed Apr. 8, 1901.)
(No Model.) 6 Sheets—Sheet 4.

Witnesses: Inventor G. W. Parsons
by Orwig & Lane Attys.

No. 715,418. Patented Dec. 9, 1902.
G. W. PARSONS.
BAND CUTTER AND FEEDER FOR THRESHING MACHINES.
(Application filed Apr. 8, 1901.)
(No Model.) 6 Sheets—Sheet 5.

Witnesses: Inventor G. W. Parsons
by Orwig & Lane Attys.

UNITED STATES PATENT OFFICE.

GEORGE W. PARSONS, OF NEWTON, IOWA.

BAND-CUTTER AND FEEDER FOR THRESHING-MACHINES.

SPECIFICATION forming part of Letters Patent No. 715,418, dated December 9, 1902.

Application filed April 8, 1901. Serial No. 54,842. (No model.)

*To all whom it may concern:*

Be it known that I, GEORGE W. PARSONS, a citizen of the United States, residing at Newton, in the county of Jasper and State of Iowa, have invented certain new and useful Improvements in Band-Cutters and Feeders for Threshing-Machines, of which the following is a specification.

The objects of my invention are, first, to provide a machine of this class made in two sections, the outer section being hinged to the inner one and capable of being folded under it; and more specifically my object is in this connection to provide a device of this class in which the machine may be folded by an operator pressing downwardly upon the outer end of the outer section, and upon such pressure the outer end of the inner section will be raised, so that when the outer end of the outer section is folded under it there will be room for an outer section of greater length than will be possible to use if the inner section does not fold upwardly.

A further object is to provide simple, durable, inexpensive, and easily-operated means whereby the knife-bearing shaft and the adjacent portions of the machine-frame may be bodily elevated with relation to the bottom of the frame, whereby the machine may be adapted for bundles of grain of different sizes, an elevation of the band-cutting knives allowing bundles of larger size to pass between the knives and the rake.

A further object is to provide improved means of simple, durable, and inexpensive construction for preventing grain from winding upon the knives or knife-shaft. More specifically in this connection it is my object to provide a stripper that may easily be adjusted to assume a position close to the face of the knife and at the same time avoid the use of nuts, bolts, and other parts that are liable to become loosened and detached.

A further object is to provide an improved automatic belt-tightener which may be adjusted to fit belts of different lengths and apply a uniform tension to the belt at all times.

A further object is to provide a speed-governor of simple, durable, and inexpensive construction, by which the operative parts of the band-cutter and feeder are not driven by the belt from the threshing-machine until the same has reached a certain predetermined speed, and when the speed falls below the predetermined number of revolutions the band-cutter and feeder will be stopped and held inoperative. In this connection it is my object more specifically to provide a device of this class of few parts that are not liable to get out of order and that are of great durability.

A further object is to provide an improved feed-governor for controlling the movements of the rake, whereby when an excessive quantity of grain is placed upon the rake it will be stopped and held before reaching the threshing-cylinder and the rake will also be automatically stopped and when the excessive quantity of grain has been removed the rake will again automatically start. In this connection it is my object to provide a governor that will stop the rake instantly, and as the excess of grain is reduced it will permit the rake to move a short distance at a time, so that the excessive grain will be fed in slow stages to the threshing-cylinder until the normal quantity of grain is borne by the rake. Then the rake may move as before.

A further object is to provide improved means for forcing the grain from the end of the rake to the cylinder, and large quantities of wet or tangled grain are separated before reaching the cylinder.

A further object in the same connection is to provide means whereby the stroke of the feeding-forks may be made in a different plane to accommodate the machine for feeding the various kinds of grain.

My invention consists in certain details in the construction, arrangement, and combination of the various parts of the machine, whereby the objects above contemplated are attained, as hereinafter more fully set forth, pointed out in my claims, and illustrated in the accompanying drawings, in which—

Referring to the accompanying drawings, I shall first describe the machine-frame.

Figure 4:
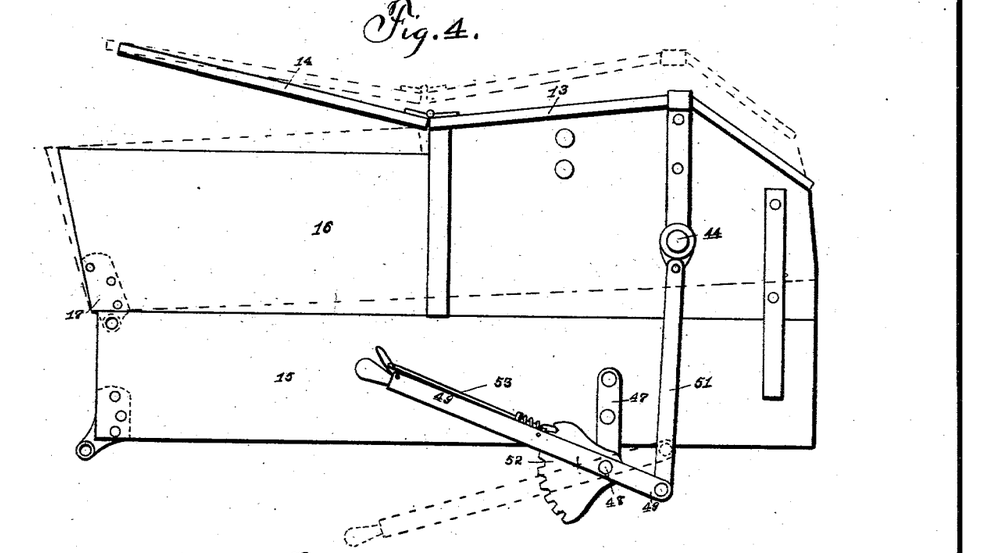
Fig. 4 shows a side elevation of the inner section of the machine-frame to illustrate the mechanism for raising and lowering the upper portion thereof relative to the lower portion, the dotted line indicating the position of the upper portion when raised.
Figure 5:
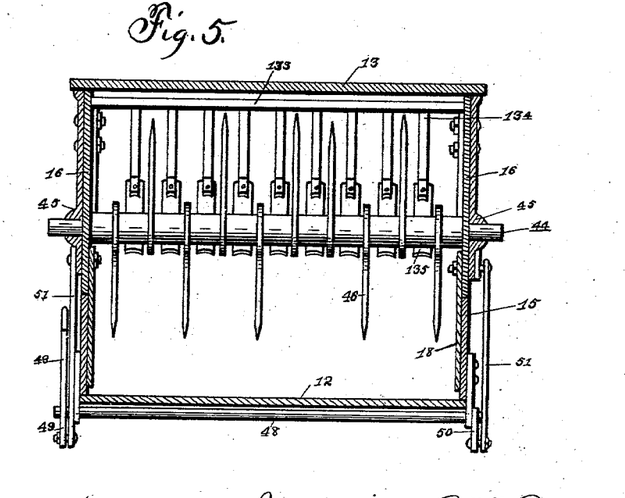
Fig. 5 shows a vertical transverse sectional view of the machine-frame, taken from a point directly in front of the band-cutting knives and looking rearwardly.
Figures 6, 7, 8, 9, 10:
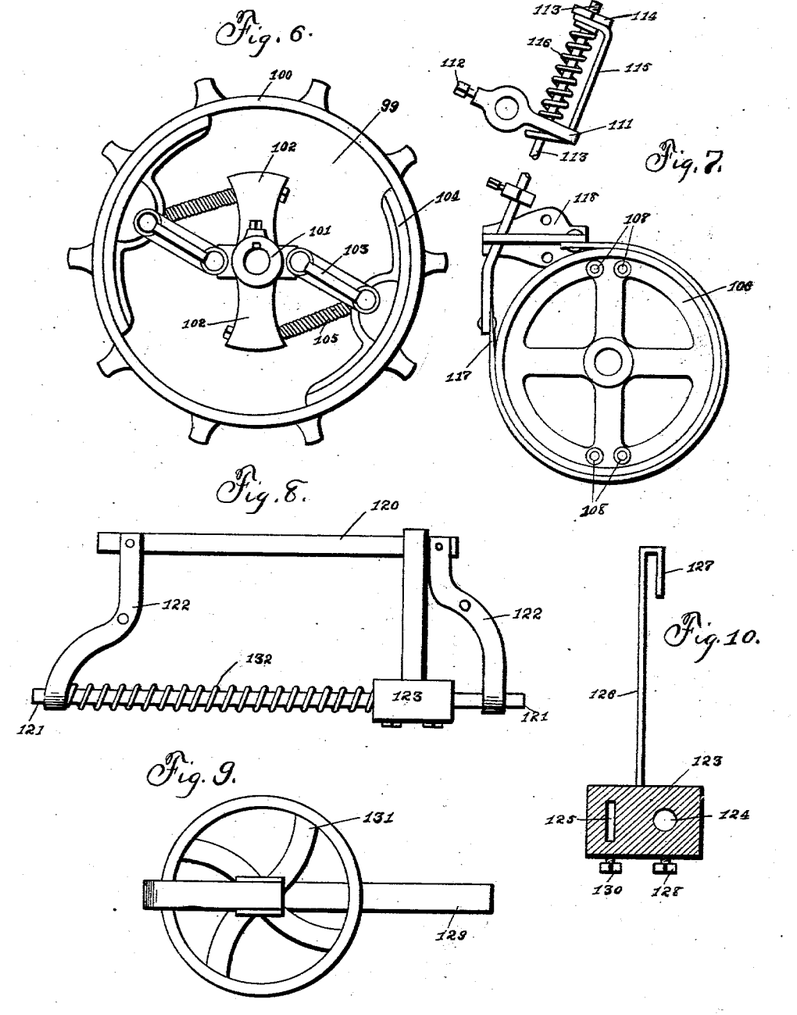
Fig. 6 shows an enlarged detail view of the inner face of the outer member of the feed-governor.
Fig. 7 shows an enlarged detail view of the outer face of the inner member of the feed-governor and also the friction-brake and its adjusting mechanism applied thereto.
Fig. 8 shows an enlarged detail elevation of the frame of the belt-tightener.
Fig. 9 shows a like view of the belt-tightener pulley and a portion of the frame in which the pulley has its bearings.
Fig. 10 shows a sectional view through that portion of the belt-tightener frame upon which the strap for supporting the belt-tightener pulley is mounted and which slides upon the belt-tightener frame.
Figures 11, 12, 13, 14:
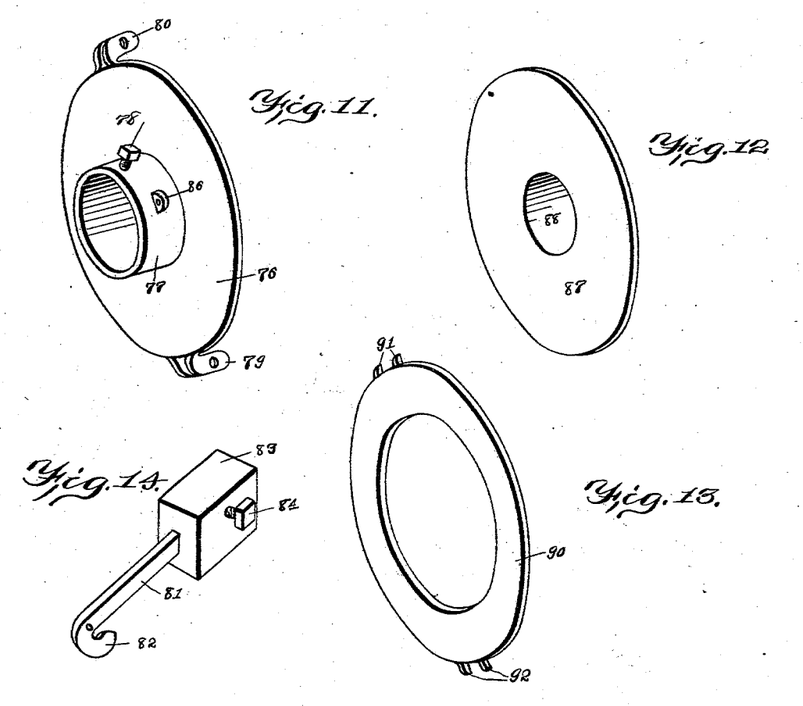
Fig. 11 shows an enlarged detail perspective view of the outer plate of the speed-governor friction-clutch device.
Fig. 12 shows a like view of the middle plate of the speed-governor friction device.
Fig. 13 shows a similar view of the outer plate of the speed-governor friction device.
Fig. 14 shows in perspective one of the weighted levers of the speed-governor.
Figure 15:
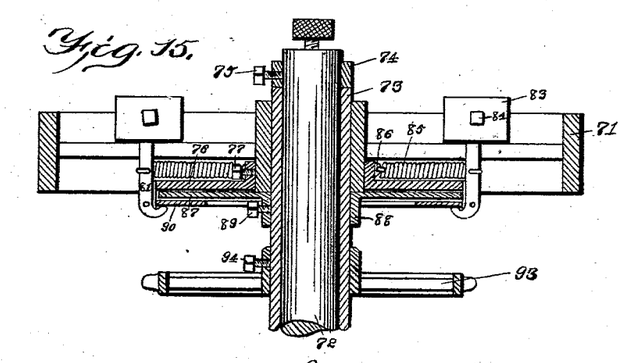
Fig. 15 shows a horizontal sectional view of the speed-governor and adjacent parts.

The reference-numeral 10 is used to indicate that section of the frame adjacent to the threshing-machine, and it is designed to be secured to the threshing-machine in the ordinary way. To the outer end portion of this part 10 I have pivoted the inner section of the rake-supporting frame upon the shaft 11. This inner section comprises two sides, a solid bottom 12 and a top 13, and a hinged section 14, forming part of the top, which may be opened to provide access to the interior of this section. The sides of this section are built up of the lower side boards 15 and the upper side boards 16, which are hinged to the side boards 15 by means of the hinges 17, thus permitting the outer end portion of the top to move upwardly relative to the bottom, as indicated by dotted lines in Fig. 4. On the inner faces of the side boards 16 I have fixed metal plates 18 to project downwardly and overlap the side boards 15, so that when the top is elevated the gap between the boards 15 and 16 will be closed by the plates 18. At the outer ends of the side boards 15 I have fixed the hinged members 19, which project some distance below the side boards 15. In each of these hinge members is a raised lip 20, having a notch 21, for purposes hereinafter made clear. The outer section of the machine-frame comprises the side boards 22 and the bottom 23. Placed upon the inner ends of the side boards 22 are the hinge members 24. These hinge members are also provided with downwardly-projecting portions to engage and coact with the mating portions of the hinge members 19, and on each of these hinge members is an outwardly-projecting lip 25, having pivoted therein the bolts 26, each of which is provided with a nut 27. When the outer section is in alinement with the inner section, the bolts 26 are made to enter the notches 21, and then the nuts 27 are turned on the bolts 26 to engage the inner faces of the lips 25, thereby preventing the outer section from moving relative to the inner section.

Figures 1, 17:
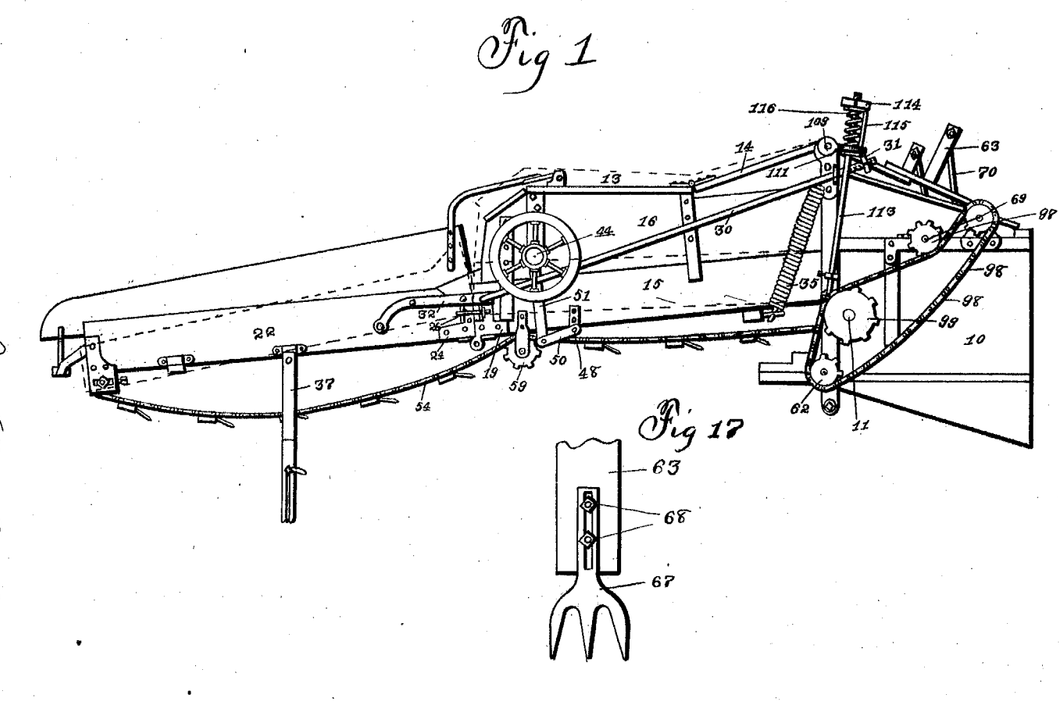
Figure 1 shows a side elevation of the complete machine, the dotted line indicating the position of the inner and outer sections of the machine when the outer end of the outer section is pressed downwardly, as it would be when starting to fold.
Fig. 17 shows a rear elevation of one of the feeding-forks to illustrate the means for adjusting the same.

I have provided means for supporting the inner end of the outer section of the machine-frame from the part 10, as follows: Attached to the upper corners of the part 10 are the brackets 28, having therein the outwardly-projecting perforated ears 29. The rods 30 are passed through said perforated ears, and nuts 31 are placed on the inner ends of said rods beyond the said perforated ears. The said rods project downwardly and toward the outer section and are pivoted to the braces 32. The function of the rods 30 is as follows: When in the position shown in Fig. 1, the rods do not serve to support the outer section, because it is held by the legs. However, when it is desired to fold the outer section under the middle one the nuts 31 on the rods will not strike the perforated ears 29 until the outer section is partially folded. Hence the said rods will not in any way interfere with the fold, as would be the case if the nuts 31 engaged the perforated ears 29 when in the position shown in Fig. 1. As soon, however, as the outer section has been folded far enough so that the legs no longer support it the rods 30 and 20 will then be in position to firmly support the weight that is thrown upon the outer end of the inner section. They will also aid in forcing the outer end of the inner section upwardly when the outer end of the outer section is forced downwardly. I have also provided means for automatically elevating the inner section, as follows: Adjacent to the brackets 28 I have provided hooks 33, and on the bottom of the inner section I have provided hooks 34. I have also provided two heavy contractile coil-springs 35, with their ends attached to said hooks, thereby normally tending to elevate the outer end of said inner section.

About the central portion of each side of the outer section is a bracket 36, and to each bracket an upright 37 is pivoted. This upright is composed of two sections which slide longitudinally relative to each other, the lower section 38 being provided with a slot 39, and a bolt 40 is passed through the part 37 and through the slot 39, and a nut 41, having a handle, is placed on the end of the bolt, so that the said parts may be adjusted longitudinally relative to each other and then firmly clamped in position.

Figure 2:
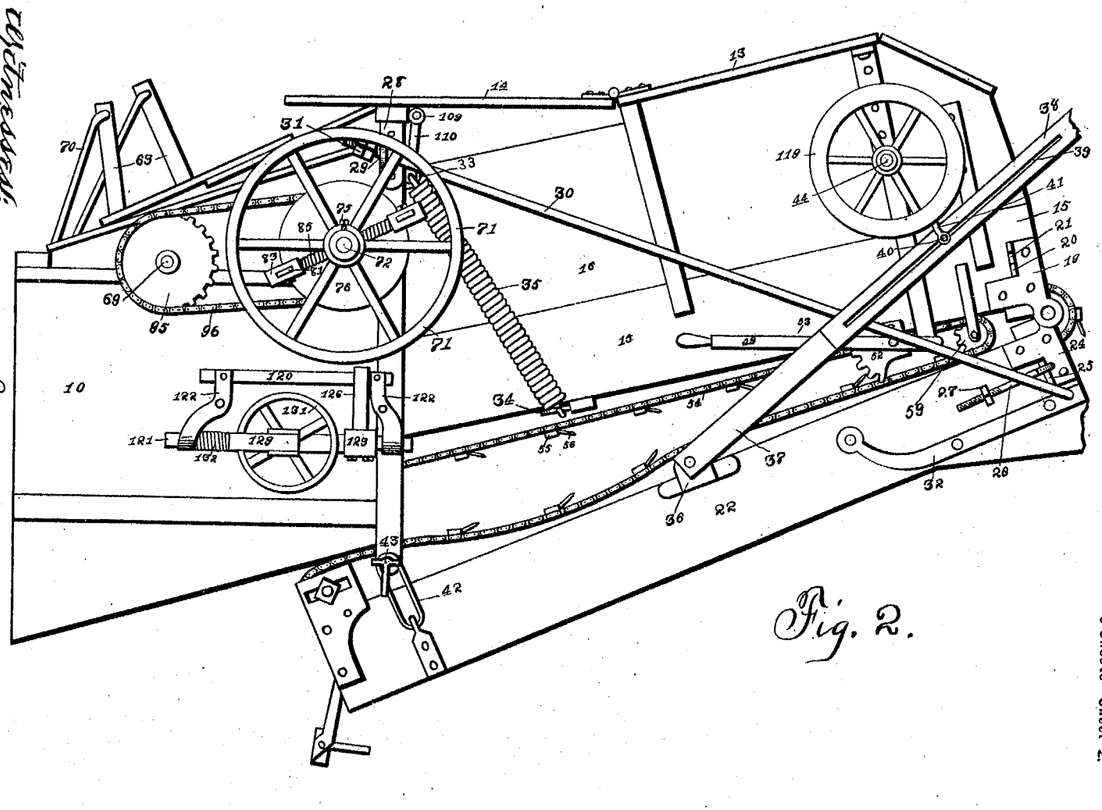
Fig. 2 shows a similar view of the opposite side of the machine in its folded position.
Figures 3, 16:
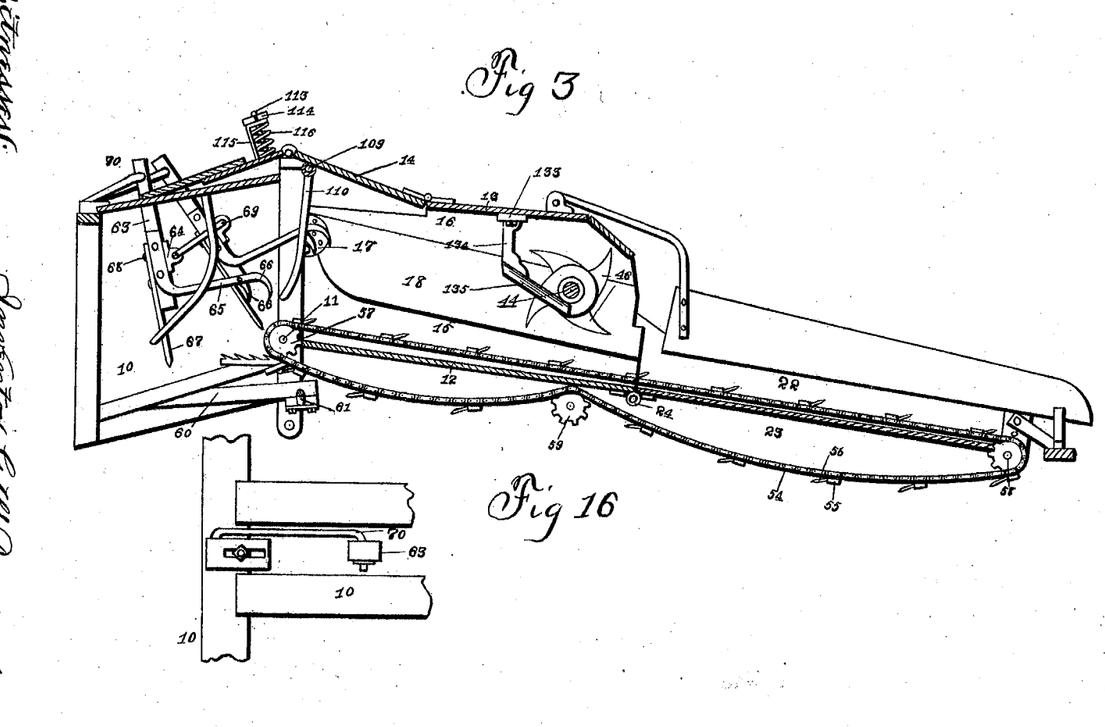
Fig. 3 shows a vertical longitudinal sectional view of the complete machine.
Fig. 16 shows a top or plan view of a part of the rear end portion of the machine-frame, illustrating the means for adjusting the feeding-forks.

The operation of the parts of the device thus far described is as follows: Assuming the machine-frame to be in the position shown in Fig. 1 and assuming, further, that it is desired to fold the same, the operator first releases the bolts 26 and then presses downwardly upon the outer end of the outer section. The legs pivoted to the outer section form a fulcrum upon which the outer section may move, the inner end thereof moving upwardly as the outer end moves downwardly. When this is started, the springs 35 aid in elevating the outer end of the inner section, and then when it is elevated to its limit, as illustrated in Fig. 2, the outer section may be swung under the inner section, and the loops 42, which are pivoted to the outer end of the outer section, are hooked upon the pins 43 on the part 10. It is obvious that if the outer end of the inner section did not rise a shorter outer section would have to be used in order to occupy the same amount of space.

The shaft of the band-cutter knives is indicated by the reference-numeral 44 and is rotatably mounted in bearings 45 in the side boards 16 on the inner section of the machine. The band-cutting knives are indicated by the reference-numeral 46 and are attached to the shaft 44 at equidistant points throughout its length. The rake travels upon the bottom 12 of this section, as will hereinafter appear, and I have provided means whereby the upper portion of this section may be moved vertically to thereby regulate the distance between the band-cutting knives and the rake, as follows: Mounted on the side boards 15 are the metal straps 47, and in the lower end of each strap is a journal 48. On one of the journals 48 a lever 49 is fulcrumed, and on the other journal a link 50 is pivoted. Connected with the opposite end of the lever 49 is a flat bar 51, the upper end of which is attached to the side boards 16. Mounted on the strap 47 adjacent to the lever 49 is a segmental rack 52, and a spring-actuated pawl 53 is connected with the lever 49 to engage said rack. By this means it is obvious that when the lever 49 is moved downwardly, as indicated by dotted lines in Fig. 4, the upper portion of this section of the machine-frame will be elevated relative to the lower portion, and the distance between the knives and the rake will be made greater.

The rake for advancing the grain to the threshing-cylinder is made of two endless sprocket-chains 54, with cross-pieces 55 attached thereto at regular intervals and teeth 56 in the cross-pieces. This rake is of the ordinary construction. It is driven by means of the shaft 11, which is provided with sprocket-wheels 57 to engage the sprocket-chains 54. At the outer end of the outer section the two sprocket-wheels 58 are provided, over which the chains pass, and beneath the inner section, near the joint between the two sections, are two idlers 59, over which the chain passes in returning. In moving toward the threshing-cylinder the chain rests on top of the bottom pieces of the section. The feed-governor for starting and stopping the conveyer will be hereinafter described. After the grain leaves the rake it is forced to the cylinder by means of the shaking-pans 60, which are mounted upon the crank-shaft 61, which crank-shaft is provided on one of its ends with a sprocket-wheel 62, whereby it may be driven. The construction of the shaking-pans is the same as in machines of this class now in common use. Above the shaking-pans I have provided a series of oscillating feeding-forks. Each of these forks is composed of a wooden body portion 63, having a bearing-box 64 on its front face. At the sides of the body portion are the arms 65, to project forwardly, and at their forward ends are the downwardly-projecting hooks or forks 66. On the rear surface of each of the body portions is a plate 67, forked at its lower end and slotted at its upper end. The forked portion of this plate projects some distance below the lower end of the body portion 63, and bolts 68 are passed through the slot into the body portion, whereby the forked plate may be vertically elevated. A crank-shaft 69 is rotatably mounted in bearings in the sides of the frame 10, and the crank-arms thereof are seated in the bearing-boxes 64 of the oscillating forks. The upper ends of these forks are supported by the links 70, which links are pivotally connected with the tops of the body portions 63 and are connected with the top of the machine-frame. Obviously by moving the point at which the said links are connected with the machine-frame toward the outer end of the machine-frame the forks will oscillate in a plane comparatively near the cylinder, and if the tops of the oscillating forks are moved toward the inner end of the machine the forks will oscillate in planes farther removed from the cylinder. Hence the said feeding-forks may be elevated to adapt themselves to grain of any kind. All of the feeding mechanism is driven from a belt-wheel 71, which is connected with the thresher by means of a belt. (Not shown.)

It is highly important that the feeding mechanism does not operate until the threshing-machine has attained a certain predetermined speed, at which the best results in threshing may be produced. I have provided means of simple and durable construction whereby this result is attained, as follows: Mounted upon the machine-frame is a stub-shaft 72. Rotatably mounted upon this shaft 72 is a sleeve 73, held against longitudinal movement by a collar 74, provided with a set-screw 75. The hub of the belt-wheel 71 is mounted upon this sleeve 73 to be capable of rotation thereon. A circular plate 76 is provided with a hub 77, designed to fit over one end of the hub of the belt-wheel 71 and be securely clamped thereto by means of the set-screw 78. On the periphery of the plate or disk 76 are two perforated lugs 79 to project toward the machine-frame, and at a point diametrically opposite the lugs 79 is another pair of lugs 80 of similar shape. Between each pair of these lugs is mounted a lever 81, having a curved end 82, and a weight 83 is adjustably mounted on each lever and held in place by means of a set-screw 84'. The weighted ends of said levers project between the spokes of the belt-wheel 71 and stand in position approximately parallel with the shaft 72. A contractile coil-spring 85 is attached to each lever and to perforated lugs 86 on the sleeve 77, so that said levers are normally held to their inner limit of movement. The numeral 87 is used to indicate a flat disk having both of its surfaces smooth and of a diameter to pass between the lugs 79 and 80 of the plate 76. This disk or plate 87 is provided with a hub 88 of a size to fit the sleeve 73, and a set-screw 89, passed through the said hub engages said sleeve and firmly clamps said disk or plate to the sleeve. A third plate or disk (indicated by the reference-numeral 90) is provided to rest against the inner face of the disk or plate 87. This disk or plate has a large central opening, and on its periphery are two outwardly-projecting lugs 91, and at a point diametrically opposite therefrom are two similar lugs 92. These lugs are designed to overlap the lugs 79 and 80 of the plate or disk 76 to prevent the plate or disk 90 from rotating relative thereto. The curved ends 82 on the levers are designed to engage the inner face of the plate or disk 90, and when the weights 83 are forced outwardly by centrifugal force the levers will obviously force the plate or disk 90 against the plate or disk 87, and it in turn will be forced against the plate or disk 76, thereby firmly clamping the plate or disk 87, which, as before stated, is secured to the sleeve 73, between the plates or disks 76 and 90, which are connected with the belt-wheel 71, so that when the speed of the belt-wheel 71 has reached a certain predetermined rate the sleeve 73 will be made to turn with it. The feeding mechanism is driven from this sleeve 73 by means of a sprocket-wheel 93, the hub of which is fixed to the sleeve 73 by means of the set-screw 94. The end of the shaft 69 projects through the machine-frame, and the sprocket-wheel 95 is fixed thereto. A chain 96 connects the sprocket-wheels 93 and 95, whereby they are rotated in unison.

I shall now describe the mechanism for controlling the movements of the endless rake.

Mounted upon the end of the shaft 69 opposite to the sprocket-wheel 95 is another sprocket-wheel 97, and a chain 98 connects the sprocket-wheel 97 with the sprocket-wheel 62, which, as before described, is attached to the shaft which drives the feed-pans 60. The same chain 98 also drives a large sprocket-wheel 99, which is loosely mounted upon the shaft 11, which drives the endless rake. This sprocket-wheel 99 is provided with an inwardly-projected rim 100 at its periphery. Keyed to the shaft 11 is a hub 101, having two radial arms 102 formed on or fixed thereto. Pivotally connected with the hub at points diametrically opposite are the rigid links 103, and pivoted to the outer ends of the links 103 are the segmental brake-shoes 104, designed to fit the inner periphery of the rim 100. The length of the links 104 is such that the brake-shoes will be forced into engagement with the rim 100 before the said links reach a position in alinement with each other. The said brake-shoes are normally held outwardly and in engagement with the rim 100 by means of the extensile coil-springs 105, which springs have one end in engagement with one of the arms 102 and the other end in engagement with one of the brake-shoes, said spring being positioned on the side of the brake-shoe which is nearest the arm 102, so that its force will be utilized in pressing the shoe outwardly against the rim. Hence under normal conditions the brake-shoes will be held against the rim with such force as to cause the hub 101 and the sprocket-wheel 99 to rotate in unison. I have provided the following means for automatically throwing the brake-shoes out of engagement with the rim 100 under certain conditions, and thereby permitting the sprocket-wheel 99 to rotate without driving the shaft 11: Mounted upon the shaft 11, adjacent to the inner face of the sprocket-wheel 99, is a wheel 106, having a smooth round periphery. This wheel is also loose upon the shaft 11. On the outer face of the wheel, near its periphery, are two outwardly-projecting lugs 107, and at a point diametrically opposite thereto are two similar lugs 108. These lugs are designed to stand on opposite sides of the links 103, so that when the wheel 106 is moved upon the shaft 11 in one direction the said lugs 107 will force the links 103 in a direction against the pressure of the springs 105, thereby withdrawing the brake-shoes from engagement with the rim 100, and when the wheel 106 is not held or obstructed in any way it will rotate freely upon the shaft 11 in unison with the hub 101. I have provided the following means for applying friction to the wheel 106 when it is desirable to stop the movements of the shaft 11, as follows: Mounted in the machine-frame above the inner end of the rake is a rock-shaft 109, and projecting downwardly therefrom is a series of arms 110, their lower ends being curved rearwardly and terminating a short distance above the inner end of the rake. Fixed to one end of the shaft 109 is a crank-arm 111, held to the shaft by means of the set-screw 112. A rod 113 passes through said arm 111, and on its upper end is a nut 114.

A yoke 115 surrounds the rod 113 near its upper end, and said yoke passes through the outer end of the arm 111 and encircles the rod 113 below the arm 111, and an extensile coil-spring 116 is mounted on the rod 113 to engage the upper end of the yoke and to engage the top of the arm 111. By this means it is obvious that the rod 113 is held to position relative to the arm 111, and yet a yielding movement against the pressure of the spring 116 is permitted relative to the said arm 111. Attached to the lower end of the rod 113 is a flexible metal band 117, which encircles the wheel 106 and is attached to a bracket 118, which is fixed to the machine-frame and which has an opening through which the rod 113 passes. By means of the parts just described it is obvious that when an excessive quantity of grain is carried upon the rake it will engage the arms 110 and force said arms rearwardly, thereby elevating the end of the arm 111 and drawing the metal band 117 tightly about the wheel 106, the pressure of the spring 116 being applied to permit the band-brake to yield slightly, so that the wheel 106 is not stopped too abruptly. In practical use with this portion of the mechanism it is obvious that when an excessive quantity of grain has reached the rear end portion of the rake the band-brake 117 will be gradually but firmly clamped upon the wheel 106, and this will cause the brake-shoes 104 to be withdrawn from contact with the rim 100, thereby permitting the wheel 99 to rotate relative to the shaft 11, thus immediately stopping the rake. By means of the feed-forks before described the top layer of this excessive grain will be drawn off until the arms 110 will be permitted to assume their normal position, whereupon the band-brake will be loosened and the hub 101 permitted to rotate with the shaft 11. One of the peculiar and greatly advantageous results to be obtained by the feed-governing mechanism is this: When the rake is stopped by the governing mechanism, none of the working parts are brought into violent contact with each other, the band-brake being yieldingly held against the wheel 106 and the wheel 106 yieldingly forcing the brake-shoes 104 away from the rim 100. Hence there is no noise or violent shocks to any part of the mechanism. Further than this, if the obstruction or excessive quantity of grain is only partially removed before the machine starts the brake-shoes 104 will be held against the rim 100 with sufficient force only to move the rake a few inches at a time. Hence the rake is slowly moved, being stopped and started at very short intervals until only the proper quantity of grain remains upon the rake.

The operative parts of the machine are driven by a belt which connects the threshing-cylinder with the belt-wheel 119, which is attached to the shaft 44, and also passes over the belt-wheel 71. I have provided means whereby any slack in this belt may be taken up and the belt applied to the wheels with uniform pressure, as follows: On the side of the machine-frame directly beneath the belt-wheel 71 is a frame composed of a top rail 120, a tube 121 below the rail 120 and parallel therewith and supported by means of the brackets 122, which are attached to the machine-frame and also to the track 120. Mounted upon the tube 121 is a block 123, having an opening 124, through which the tube 121 is passed, and also having another opening 125, parallel with the opening 124. At the top of the block 123 is a hanger 126 to project upwardly and provided at its top with a hook 127, designed to overlap the track 120. By this means it is obvious that the block 123 may be adjusted longitudinally upon the tube 121 and by means of the set-screw 128 may be firmly clamped in any desirable position.

The numeral 129 indicates a flat bar designed to enter the slot 125, where it may be clamped by means of the set-screw 130. This bar has its opposite end curved and bent outwardly to overlap its body portion, and the belt-wheel 131 is rotatably mounted between the sides of the said bar. An extensile coil-spring 132 is mounted upon the tube 121, with one end in engagement with the block 123 and the other end in engagement with the frame.

In practical operation it is obvious that the belt-wheel 131 may be moved in the block 125 far enough to make the belt as tight as is desirable. Then the set-screw 130 is operated to clamp the bar 129 in such position. Then the spring 132 will yieldingly hold the belt-wheel to such position. Obviously, if the belt stretches, the bar 129 may be adjusted in the block to take up the slack without in any way affecting the pressure of the spring 132, which will be uniform at all times.

I have provided means for preventing the grain from becoming entangled in the knives or from winding about the shaft 44, as follows: On the under side of the top 13 of the frame is a cross-piece 133, and bolted to said cross-piece at suitable distance apart are the brackets 134. Bolted to each bracket is a stripper 135, which is semicircular in cross-section. Said stripper projects downwardly and toward the outer end of the machine-frame, and its lower end terminates directly under the shaft 44. These strippers are preferably made of heavy sheet metal, and the sides of each independent stripper may be bent inwardly or outwardly, as desired, to make it stand in a position close to the adjacent knife, and when once adjusted in position it will be permanently and firmly held, and obviously no grain can become tangled in the knives or wound upon the shaft.

Having thus described my invention, what I claim, and desire to secure by Letters Patent of the United States therefor, is—

1. In a band-cutter and feeder, the combination, with a frame-section hinged to swing in a vertical plane, of an outer frame-section hinged to the first and capable of folding under it and supporting-legs attached to the central portion of the outer section, designed to stand on the ground-surface and form a fulcrum by which, when pressure is applied to the outer end of the outer section the outer end of the inner section and the inner end of the outer section will be moved upwardly, so that the outer section will readily fold under the inner section, for the purposes stated.

2. In a band-cutter and feeder, the combination, of a stationary frame-section, a middle frame-section hinged to the stationary section to move in a vertical plane, springs attached to the stationary section, and to the middle section, said springs tending to elevate the middle section when the frame is in position ready for use and an outer section hinged to the middle section and capable of folding under it, for the purposes stated.

3. In a band-cutter and feeder, the combination of a stationary frame-section, a middle frame-section hinged to the stationary section to move in a vertical plane, springs attached to the stationary section and to the middle section, whereby the outer end of the middle section is normally held in an elevated position and an outer section hinged to the middle section and capable of folding under it, and supporting-legs pivotally mounted near the central portion of the outer section whereby, when pressure is applied to the outer end of the outer section the inner end of the outer section and the outer end of the middle section will be jointly elevated and the outer section be permitted to fold under the inner one, for the purposes stated.

4. In a band-cutter and feeder, the combination of a stationary frame-section, a middle frame-section hinged at its lower corner to the stationary section, with its upper corner designed to enter between the sides of the stationary section, springs attached to the stationary section and to the middle section for normally elevating the outer end of the middle section, an outer section hinged to the middle section to be capable of folding under it, detachable locking mechanism for securing the inner and outer sections together when in alinement with each other, supporting-legs pivotally attached to the central portion of the outer section to form a fulcrum upon which the connected portions of the inner and outer sections may be elevated when the outer end of the outer section is pressed downwardly, and links in the outer end of the outer section, whereby it may be supported from the stationary section, for the purposes stated.

5. In a band-cutter and feeder, the combination of a stationary frame-section, a middle frame-section hinged to the stationary frame-section, hinge members at the outer corner of the middle frame-section to project downwardly below the section, an outer frame-section, hinge members at the inner corners of the outer frame-section to project downwardly and to mate with the aforesaid hinge members, supporting-legs pivoted beneath the central portion of the outer section perforated lugs 29 on the sides of the stationary frame, straps 32 fixed to the inner end of the outer frame-section, and rods 30 pivoted to the straps 32 passed through the perforated lugs 29 and having the adjustable nuts 31, on their ends, substantially as, and for the purposes stated.

6. In a band-cutter and feeder, the combination of a stationary machine-frame section, a hinged middle section, an outer section hinged to the middle section to be capable of folding under it, rods pivotally connected with the inner end portion of the outer section above the hinge-joint connecting the outer and the middle sections and slidingly connected with the stationary section, and stops on the rods, so positioned that the rods may slide a short distance outwardly from the stationary section before the stops will engage and prevent its further movement, for the purposes stated.

7. The combination, with a band-cutter and feeder, of an improved speed-governor, comprising a belt-wheel, a disk secured to the shaft upon which the belt-wheel rotates and in engagement with the face of the first disk, a third disk arranged adjacent to the opposite face of the middle disk and capable of movement to and from the middle disk, but not of rotation relative to the first disk, and levers fulcrumed to the first disk and having curved ends in engagement with the last-mentioned disk, weights on said levers, whereby the action of centrifugal force will operate the levers in such manner as to force the last-mentioned disk against the middle one, and yielding pressure devices for holding the levers to their inner limit of movement, for the purposes stated.

8. In a band-cutter and feeder, an improved speed-governor, comprising in combination, a stub-shaft 72, a sleeve 73 rotatably mounted thereon, a belt-wheel 71 rotatably mounted on the sleeve, a disk 76 detachably mounted on the hub of the belt-wheel and having the perforated lugs 79 and 80, a disk 87 fixed to the sleeve 73, with one face in engagement with the disk 76, a third disk 90 having the lugs 91 and 92 placed adjacent to the other face of the disk 87 and with the lugs 91 and 92 overlapping the lugs 79, levers 81 having the curved ends 82 fulcrumed in the lugs 79 and 80, adjustable weights 83 on their ends, and springs 85 for normally holding said levers to their inner limit of movement, for the purposes stated.

GEORGE W. PARSONS.

Witnesses:
A. R. OGBURN,
LEM. B. GAGHAGEN.